(12) United States Patent
Shida (10) Patent No.: US 7,215,389 B2
(45) Date of Patent: May 8, 2007

(54) HOUSING FOR LIQUID CRYSTAL DISPLAY DEVICE COMPRISING PLURALITY OF GROOVES, WHEREIN EACH GROVE INCLUDES AN UPPER PORTION FORMED INTO AN ESSENTIALLY SEMICIRCULAR SHAPE AND A CIRCULAR-ARC BULGING PORTION

(75) Inventor: Susumu Shida, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 299 days.

(21) Appl. No.: 10/958,677

(22) Filed: Oct. 4, 2004

(65) Prior Publication Data

US 2005/0110917 A1    May 26, 2005

(30) Foreign Application Priority Data

Oct. 3, 2003    (JP)    ............... P.2003-345880

(51) Int. Cl.
 *G02F 1/1333* (2006.01)
(52) U.S. Cl. ............... 349/58; 349/60; 361/681
(58) Field of Classification Search ............... 349/58, 349/59, 60; 361/681
 See application file for complete search history.

(56) References Cited

U.S. PATENT DOCUMENTS 6,175,396 B1 * 1/2001 Kim et al. ............... 349/58
6,593,979 B1 * 7/2003 Ha et al. ............... 349/58
6,937,297 B2 * 8/2005 Kang et al. ............... 349/58
2003/0122995 A1 * 7/2003 Park et al. ............... 349/58

FOREIGN PATENT DOCUMENTS

JP    10-69236    3/1998
JP    3087458    5/2002

OTHER PUBLICATIONS

Patent Abstracts of Japan, Publication No. 10-069236, Publication Date Mar. 10, 1998, 1 page.

* cited by examiner

*Primary Examiner*—Andrew Schechter
*Assistant Examiner*—Thanh-Nhan P Nguyen
(74) *Attorney, Agent, or Firm*—Osha Liang LLP (57) ABSTRACT

In a liquid-crystal module equipped with a frame, a bezel, and a liquid-crystal panel, the frame includes groove sections. Each of the groove sections has an upper portion formed into an essentially-semicircular shape conforming to an outer peripheral shape of a cylindrical insert nut provided on a side surface of a bezel, and a circular-arc bulging portion provided on at least one side surface of the groove section such that a distance between the bulging portion and an opposing side surface becomes smaller than an outer diameter of the insert nut. Further, the plurality of groove sections are provided at predetermined intervals so as to penetrate from an exterior surface to an interior surface of the frame.

7 Claims, 7 Drawing Sheets

PRIOR ART

FIG. 13

PRIOR ART

FIG. 14

PRIOR ART

HOUSING FOR LIQUID CRYSTAL DISPLAY DEVICE COMPRISING PLURALITY OF GROOVES, WHEREIN EACH GROVE INCLUDES AN UPPER PORTION FORMED INTO AN ESSENTIALLY SEMICIRCULAR SHAPE AND A CIRCULAR-ARC BULGING PORTION

BACKGROUND OF THE INVENTION

1. Field of the Invention

The present invention relates to a liquid-crystal module and a liquid-crystal display device, and more particularly, to a liquid-crystal module and a liquid-crystal display device, both having a bezel having nut members, wherein a thread groove is formed on an interior circumferential surface of each nut member.

2. Description of the Related Art

A liquid-crystal module (a liquid-crystal display device) having a bezel including a nut member having a thread groove formed on an interior circumferential surface thereof has hitherto been known (see JP-A-10-69236 and Japanese Utility Model Registration No. 3087458).

JP-A-10-69236 discloses a flat display device according to a first conventional example. In this device, a substantially cylindrical nut having a thread groove formed on an interior circumferential surface thereof is provided at a location on one frame (i.e., the bezel) where another frame is to be screwed, and a screw hole is provided at a position on the other frame where the one frame is to be screwed. In the structure described in JP-A-10-69236, after the screw has been inserted into the screw hole of the other frame, the screw is screwed into the one frame (i.e., the bezel), thereby fixing the two frames through use of a single screw. When compared with a case where two frames are separately fixed through use of different screws, the number of screws and the number of screwing steps are diminished.

Japanese Utility Model Registration No. 3087458 describes a liquid-crystal module according to a second conventional example. In this module, a curling nut mount hole, which is to be provided in a bezel and has a thread groove formed on an interior circumferential surface thereof, is formed into a hexagonal shape. A hexagonal fitting section to be fitted to the mount hole of the bezel is provided in the curling nut. According to the structure described in Japanese Utility Model Registration No. 3087458, when the curling nut is inserted into the hexagonal mount hole of the bezel, the hexagonal fitting section of the curling nut fits to the hexagonal mount hole of the bezel. When a screw is screwed into the curling nut, the curling nut is prevented from rotating along with the screw. In Japanese Utility Model Registration No. 3087458, the screw is fastened to the curling nut, whereby the bezel and the case (frame) are fixed together.

Figure 12:
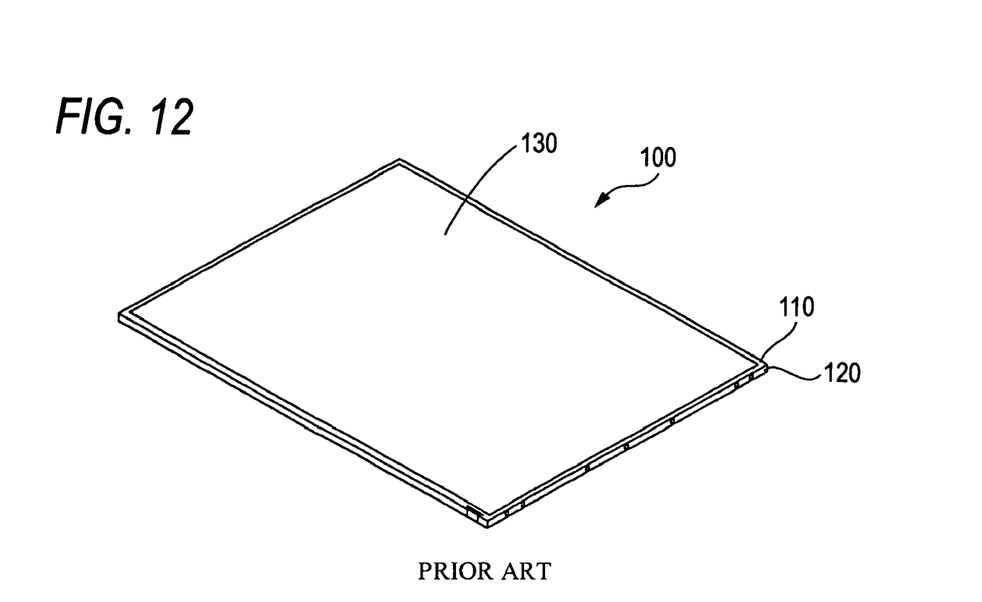
FIG. 12 is a perspective view showing a conventional liquid-crystal module.
Figure 13:
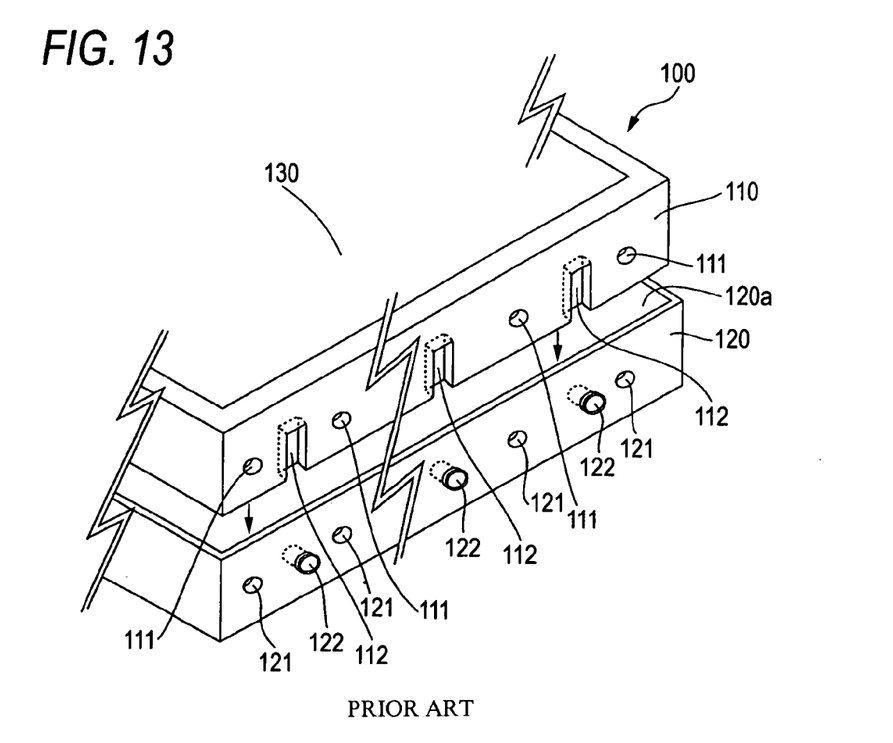
FIG. 13 is an enlarged perspective view partially showing that the conventional liquid-crystal module shown in FIG. 12 is exploded.
Figure 14:
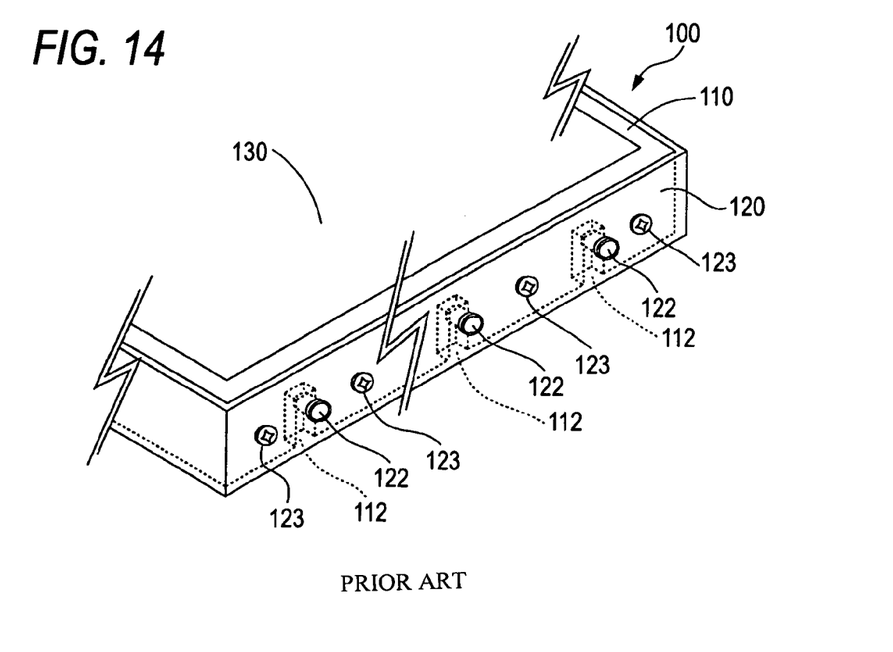
FIG. 14 is an enlarged perspective view showing that the frame is fitted and fixed to the bezel in the state shown in FIG. 13.

FIG. 12 is a perspective view showing a liquid-crystal module according to a third conventional example. FIG. 13 is an enlarged perspective view partially showing that the liquid-crystal module according to the third conventional example shown in FIG. 12 is exploded. FIG. 14 is an enlarged perspective view showing that the frame is fitted and fixed to the bezel in the state shown in FIG. 13. By reference to FIGS. 12 to 14, the structure of the liquid-crystal module 100 according to the third conventional example will first be described.

As shown in FIG. 12, the liquid-crystal module 100 according to the third conventional example is equipped with a frame of resin 110, a metal bezel 120, and a liquid-crystal panel 130. The frame 110 is provided so as to support an outer peripheral portion of the liquid-crystal panel 130. As shown in FIG. 13, the bezel 120 has a recessed section 120a into which the frame 110 is to be fitted.

As shown in FIG. 13, four screw holes 121 and three cylindrical insert nuts 122, each having a thread groove on an interior circumferential surface thereof, are provided in the side surface of the bezel 120. The insert nuts 122 are provided on the bezel 120 by means of caulking, so as to protrude toward an interior circumferential surface of the recessed section 120a (i.e., toward the frame 110) of the bezel 120. The insert nuts 122 are used for fixing together the liquid-crystal module 100 serving as a component to be used in a liquid-crystal display device (not shown) and an enclosure (frame) (not shown) of the liquid-crystal display device. The screw holes 121 are provided for inserting screws 123 when the frame 110 is fitted and fixed to the recessed section 120a of the bezel 120 by means of the screws 123 (see FIG. 14).

As shown in FIG. 13, the frame 110 has three groove sections 112 to be used for housing the insert nuts 122 projecting toward the interior circumferential surface of the bezel 120. Each of the grooves 112 is provided so as to have a predetermined depth from the bottom of an exterior surface of the frame 110. Moreover, four screw holes 111, each having a female thread for fixing the corresponding screw 123, are provided in the side surface of the frame 110. The screw holes 111 of the frame 110 are provided at positions corresponding to the screw holes 121 of the bezel 120.

When the liquid-crystal module 100 is assembled, the frame 110 is fitted into the recessed section 120a of the bezel 120 in the state shown in FIG. 13. As shown in FIG. 14, the insert nuts 122 of the bezel 120 are housed in the groove sections 112 of the frame 110. Subsequently, the four metal screws 123 are screwed into the four screw holes 111 of the frame 110, each screw hole having a female thread, by way of the four screw holes 121 of the bezel 120. Thereby, the frame 110 supporting the liquid-crystal panel 130 and the bezel 120 are fixed together, to thus assemble the liquid-crystal module 110.

In the liquid-crystal module 100 of the third conventional example shown in FIGS. 13 and 14, the groove section 112 provided in the frame 110 is formed as a recess section (a storage section) for the insert nuts 122. The insert nut 122 does not contribute to fastening of the bezel 120 to the frame 110. Specifically, the frame 110 and the bezel 120 have hitherto been fastened together by means of only the screws 123. In order to secure constant fastening force, a certain number of screws to be used for fastening the frame 110 to the bezel 120 are required. For this reason, there have been a problem of an increase in the number of parts and an increase in the number of steps (assembly steps) during a screwing process.

The frame 110 is formed from resin. The screw holes 111 having female thread sections formed in the frame 110 suffer a disadvantage of screw threads of the female thread sections being liable to collapse as compared with screw holes formed in the metal frame. When the screw threads of the female thread sections of the screw holes 111 have become collapsed, difficulty is encountered in fastening the frame. As mentioned above, since the number of screws is large, the possibility of the screw threads of the screw holes 111 of the frame 110 being collapsed is increased correspondingly. Consequently, an assembly failure is likely to arise, which is problematic.

In the structure described in JP-A-10-69236, one frame (e.g., the bezel) is fixed to the other frame by means of fastening the screws to the nut sections formed in the one frame (the bezel). In order to secure constant fixing force between one frame (the bezel) and the other frame, a certain number of locations to be screwed are required. Therefore, as in the case of the liquid-crystal module according to the third embodiment shown in FIG. 13, difficulty is countered in curtailing the number of parts and the number of assembly steps.

In the structure described in Japanese Utility Model Registration No. 3087458, the bezel is fixed to the case (the frame) by means of fastening the screws only. In order to secure constant fixing force between the bezel and the case (the frame), a certain number of screwed are required. Therefore, as in the case of the liquid-crystal module according to the third embodiment shown in FIG. 13, difficulty is countered in curtailing the number of parts and the number of assembly steps.

SUMMARY OF THE INVENTION

The present invention has been conceived to solve such a problem and aims at providing a liquid-crystal module (a liquid-crystal display device) which reduces the possibility of occurrence of an assembly failure as well as a reduction in the number of parts and assembly steps.

In order to achieve the object, a liquid-crystal module according to a first aspect of the present invention is directed toward a liquid-crystal module including a liquid-crystal panel; a frame of resin supporting an outer peripheral portion of the liquid-crystal panel; a metal bezel having a recessed section into which the frame of resin is to be inserted; a cylindrical insert nut which is mounted on a side surface of the bezel so as to project toward an interior surface of the recessed section of the bezel and which has a thread groove in the interior surface thereof; a first screw hole provided in the side surface of the bezel for inserting the screw when the frame is fitted into and fixed to the recessed section of the bezel; a second screw hole having a female thread which is provided at a position on the side surface of the frame corresponding to the first screw hole and is for fastening the screw; and a groove section which is provided so as to have a predetermined depth from a bottom section of an exterior surface of the frame and houses the insert nut projecting toward the interior surface of the bezel, wherein the groove section is formed in a predetermined number at predetermined intervals so as to penetrate from the exterior surface to the interior surface of the frame; and each of the plurality of groove sections includes an upper portion formed into an essentially semicircular shape so as to follow an outer peripheral shape of the cylindrical insert nut and a circular-arc bulging portion for fixing the insert nut to the upper portion of the groove section, the bulging portion being provided on at least one side surface of the groove section such that a distance between the bulging portion and an opposing side surface becomes smaller than an outer diameter of the insert nut.

As mentioned above, in the liquid-crystal module according to the first aspect, the bulging portion for fastening the insert nut to the groove section is provided on at least one side surface of the groove section which houses the insert nut projecting toward the interior surface of the bezel such that a distance between the bulging portion and an opposing side surface becomes smaller than an outer diameter of the insert nut. As a result, the insert nut can be fixed with the groove section by means of the bulging portion. Hence, the bezel to which the insert nut is attached and the frame having the groove section can be fastened together. Since the bezel and the frame have been fastened together by means of the insert nut and the groove section, the number of screws to be used for fastening the bezel to the frame can be reduced as compared with the number of screws employed heretofore. Therefore, the number of parts and processing steps can be curtailed. Thereby, the number of the first screw holes formed in the frame of resin can also be reduced. The possibility of occurrence of an assembly failure, which would otherwise be attributable to collapse of the screw threads of the screw holes formed in the frame of resin, can also be reduced, because the number of first screw holes formed in the frame of resin is small. As a result of provision in the groove section of the upper portion formed into a substantially-semicircular form so as to follow the outer peripheral shape of the cylindrical insert nut, the outer peripheral portion of the insert nut can be readily fixed by means of the upper portion and the circular-arc bulging portion. The groove section is formed so as to penetrate from the exterior surface to the interior surface of the frame, and the groove section is formed in a predetermined numbers with predetermined intervals therebetween, whereby the groove sections become easy to deflect in the lateral direction. Hence, when the insert nut is fitted into the area of the groove where the bulging portion is situated and which has a width (distance) smaller than the outer diameter of the insert nut, the groove sections can be readily broadened laterally. Consequently, the insert nuts can be readily fitted into the groove sections. As a result of the bulging portion being formed into a circular-arc shape, when the insert nut passes through the area where the bulging portion of the groove section is situated and which has a width (distance) smaller than the outer diameter of the insert nut, the insert nut can be easily passed through the area.

A liquid-crystal module according to a second aspect of the present invention is directed toward a liquid-crystal module including a liquid-crystal panel; a frame of resin supporting an outer peripheral portion of the liquid-crystal panel; a metal bezel having a recessed section into which the frame of resin is to be inserted; a cylindrical insert nut which is mounted on a side surface of the bezel so as to project toward an interior surface of the recessed section of the bezel and which has a thread groove in the interior surface thereof; a first screw hole provided in the side surface of the bezel for inserting the screw when the frame is fitted into and fixed to the recessed section of the bezel; a second screw hole having a female thread which is provided at a position on the side surface of the frame corresponding to the first screw hole and is for fastening the screw; and a groove section which is provided so as to have a predetermined depth from a bottom section of an exterior surface of the frame and houses the insert nut projecting toward the interior surface of the bezel, wherein the groove section is formed in a predetermined number at predetermined intervals so as to penetrate from the exterior surface to the interior surface of the frame; each of the plurality of groove sections includes an upper portion formed into an essentially semicircular shape so as to follow an outer peripheral shape of the cylindrical insert nut and a circular-arc bulging portion which is provided on at least one side surface of the groove section such that a distance between the bulging portion and an opposing side surface becomes smaller than an outer diameter of the insert nut and which fixes the insert nut to the upper portion of the groove section; and the frame further includes a cavity section which renders easy to deflect the side surface having the bulging portion of the groove section formed thereon and which is provided at a position spaced a predetermined distance from at least one side surface having the bulging portion of the groove section formed thereon, so as to penetrate from the exterior surface to the interior surface of the frame.

As mentioned above, in the liquid-crystal module according to the second aspect, the bulging portion for fastening the insert nut to the groove section is provided on at least one side surface of the groove section which houses the insert nut projecting toward the interior surface of the bezel such that a distance between the bulging portion and an opposing side surface becomes smaller than an outer diameter of the insert nut. As a result, the insert nut can be fixed with the groove section by means of the bulging portion. Hence, the bezel to which the insert nut is attached and the frame having the groove section can be fastened together. Since the bezel and the frame have been fastened together by means of the insert nut and the groove section, the number of screws to be used for fastening the bezel to the frame can be reduced as compared with the number of screws employed heretofore. Therefore, the number of parts and processing steps can be curtailed. Thereby, the number of the first screw holes formed in the frame of resin can also be reduced. The possibility of occurrence of an assembly failure, which would otherwise be attributable to collapse of the screw threads of the screw holes formed in the frame of resin, can also be reduced, because the number of first screw holes formed in the frame of resin is small. As a result of provision in the groove section of the upper portion formed into a substantially-semicircular form so as to follow the outer peripheral shape of the cylindrical insert nut, the outer peripheral portion of the insert nut can be readily fixed by means of the upper portion and the circular-arc bulging portion. The groove section is formed so as to penetrate from the exterior surface to the interior surface of the frame, and the groove section is formed in a predetermined number with predetermined intervals therebetween, whereby the groove sections become easy to deflect in the lateral direction. Hence, when the insert nut passes through the area of the groove section where the bulging portion is situated and which has a width (distance) smaller than the outer diameter of the insert nut, the groove sections can be readily broadened laterally. Consequently, the insert nut can be readily fitted into the groove section. As a result of the bulging portion being formed into a circular-arc shape, when the insert nut passes through the area where the bulging portion of the groove section is situated and which has a width (distance) smaller than the outer diameter of the insert nut, the insert nut can be easily passed through the area.

Moreover, as mentioned previously, the liquid-crystal module according to the second aspect has the cavity section for rendering easy to deflect the side surface having the bulging portion of the groove section formed thereon. This cavity section is provided at a position spaced a predetermined distance from at least one side surface having the bulging portion of the groove section formed thereon, so as to penetrate from the exterior surface to the interior surface of the frame. When the insert nut passes through the area of the groove where the bulging portion is situated and which has a width (distance) smaller than the outer diameter of the insert nut, the bulging portion of the groove section can be deflected in a direction in which the groove section is broadened. Hence, the insert nut can be readily fitted into the groove section.

A liquid-crystal display device according to a third aspect of the present invention includes a liquid-crystal panel; a frame for supporting an outer peripheral portion of the liquid-crystal panel; a bezel having a recessed section into which the frame is to be fitted; a nut member which is provided in the bezel so as to project toward an interior surface of the recessed section of the bezel and has a screw thread on an interior circumferential surface thereof; and a groove section provided in the frame for housing the nut member, wherein the groove section has a bulging portion which is provided on at least one side surface of the groove section such that a distance between the bulging portion and an opposing side surface becomes smaller than an outer diameter of the nut member.

As mentioned previously, in the liquid-crystal display device according to the third aspect, the bulging portion, which fastens the nut member on the upper portion of the groove section, is provided on one side surface of the groove section for housing the nut member projecting toward the interior surface of the bezel, such that a distance between opposing side surfaces becomes smaller than the outer diameter of the nut member. As a result, the nut member can be fastened with the groove section by means of the bulging portion, and hence the bezel having the nut member attached thereon can be fixed to the frame having the groove section. When the bezel and the frame are fastened together by means of screws, the bezel and the frame are fastened together by means of the nut member and the groove section, and hence the number of screws to be used for fastening the bezel to the frame can be reduced as compared with the number of screws employed heretofore. Therefore, the number of parts and processing steps can be curtailed. Moreover, even when the frame is made of resin, the number of the screw holes formed in the frame of resin can be reduced. The possibility of occurrence of an assembly failure, which would otherwise be attributable to collapse of the screw threads of the screw holes formed in the frame of resin, can also be reduced, because the number of screw holes formed in the frame of resin is small.

In the liquid-crystal display device according to the third aspect, the groove section is preferably formed in a predetermined number at predetermined intervals so as to penetrate from an exterior surface to the interior surface of the frame. By means of such a configuration, the groove section becomes easy to deflect in the lateral direction. Hence, when the insert nut passes through the area of the groove section where the bulging portion is situated and which has a width (distance) smaller than the outer diameter of the insert nut, the groove section can be readily broadened laterally. As a result, the insert nut can be readily fitted into the groove section.

In the liquid-crystal display device according to the third aspect, the nut member preferably assumes a cylindrical shape, and the groove section preferably include an essentially semicircular upper portion formed so as to follow an outer peripheral shape of the cylindrical nut member. By means of this configuration, the outer peripheral portion of the nut member can be readily fastened by means of the upper portion and the bulging portion of the groove section.

In the liquid-crystal display device according to the third aspect, the frame preferably further includes a cavity section which is spaced a predetermined distance from at least one side surface of the groove section for rendering the side surface of the groove section easy to deflect. By means of such a configuration, when the nut member passes through the area of the groove section where the bulging portion is situated and which has a width (distance) smaller than the outer diameter of the insert nut, the bulging portion of the groove section can be deflected in a direction in which the groove section is broadened. As a result, the nut member can be readily fitted into the groove section.

In this case, the cavity section is preferably formed so as to penetrate from the exterior surface to the interior surface of the frame. By means of such a configuration, the side surface of the groove section can be made more easy to deflect, and hence the nut member can be fitted into the groove section more easily.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1:
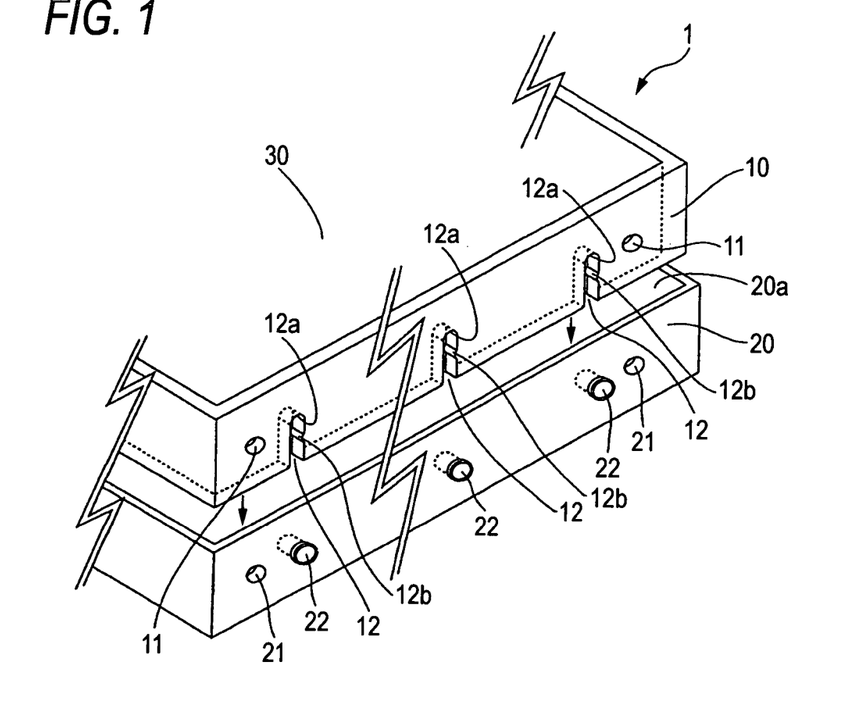
FIG. 1 is an enlarged perspective view partially showing an exploded state of a liquid-crystal module equipped with a liquid-crystal panel, a frame, and a bezel according to a first embodiment of the present invention.
Figure 2:
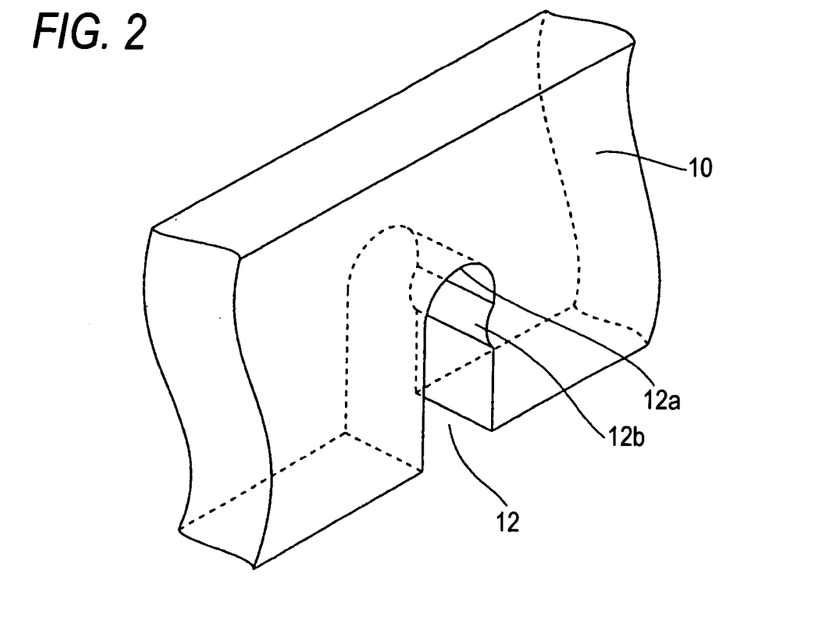
FIG. 2 is an enlarged perspective view of a groove section according to the first embodiment shown in FIG. 1.
Figure 3:
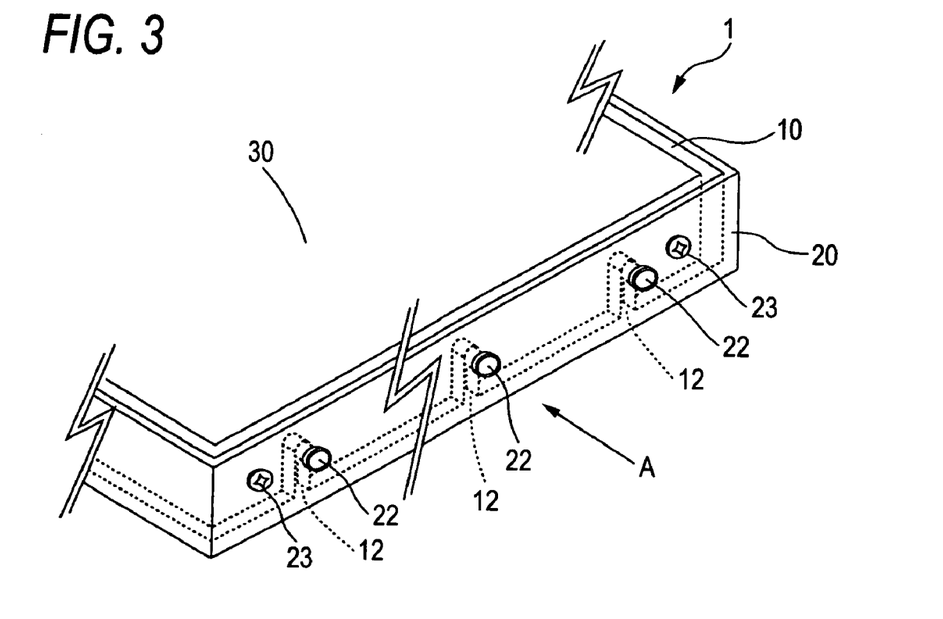
FIG. 3 is an enlarged perspective view showing that a frame is fixedly fitted into a bezel in the state shown in FIG. 1.
Figure 4:
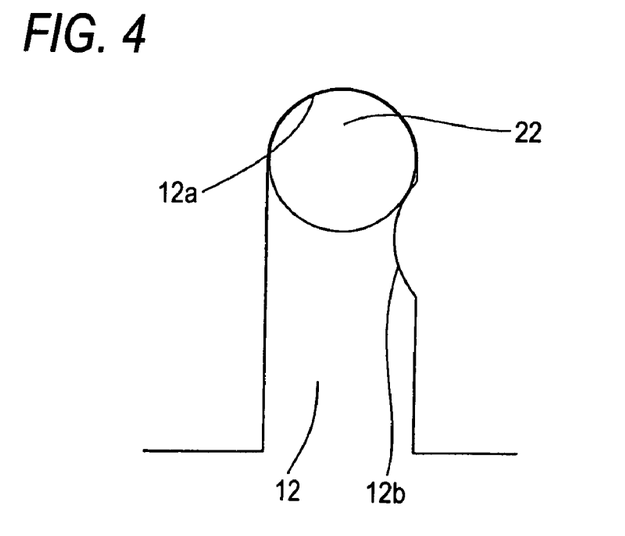
FIG. 4 is a view of the module when viewed in the direction indicated by arrow A shown in FIG. 3.

Embodiments of the present invention will be described hereinbelow by reference to the drawings.
First Embodiment FIG. 1 is an enlarged perspective view partially showing an exploded state of a liquid-crystal module equipped with a liquid-crystal panel, a frame, and a bezel according to a first embodiment of the present invention. FIG. 2 is an enlarged perspective view of a groove section according to the first embodiment shown in FIG. 1. FIG. 3 is an enlarged perspective view showing that a frame is fixedly fitted into a bezel in the state shown in FIG. 1. FIG. 4 is a view of the module when viewed in direction arrow A shown in FIG. 3. The liquid-crystal module according to the first embodiment of the present invention will be described by reference to FIGS. 1 through 4.

As shown in FIG. 1, the liquid-crystal module 1 of the first embodiment is equipped with a frame 10 of resin, a metal bezel 20, and a liquid-crystal panel 30. The frame 10 is provided so as to support an outer peripheral portion of the liquid-crystal panel 30. As shown in FIG. 1, the bezel has a recessed section 20a into which the frame 10 is to be fitted.

As shown in FIG. 1, two screw holes 21 and three cylindrical metal insert nuts 22 are provided in the side surface of the bezel 20, wherein a thread groove is formed in an interior surface of each of the three insert nuts 22. The screw hole 21 is an example of a "first screw hole" of the present invention, and the insert nut 22 is an example of a "nut member" of the present invention. The insert nuts 22 are secured in the bezel 20 by means of caulking so as to protrude toward an interior surface of the recessed section 20a (i.e., toward the frame 10). These insert nuts 22 are used for fixing the liquid-crystal module 1, which is a part for use in a liquid-crystal display device (not shown), to an enclosure (frame) (not shown) of the liquid-crystal display device. When the frame 10 is fitted into the recessed section 20a of the bezel 20 with screws 23 (see FIG. 3), the screw holes 21 are used for inserting the screws 23. Screw holes 11 having female threads to be used for fixing the screws 23 are formed in the side surface of the frame 10. The screw hole 11 is an example of a "second screw hole" of the present invention. The screw holes 11 of the frame 10 are provided at positions corresponding to the screw holes 21 of the bezel 20.

As shown in FIG. 1, in the first embodiment, three groove sections 12 to be used for fixing the insert nuts 22 protruding toward the interior surface of the bezel 20 are formed in the frame 10. This groove section 12 is formed to have a predetermined depth from the bottom of an exterior surface of the frame 10 and to penetrate from the exterior surface to the interior surface of the frame 10. As shown in FIG. 2, each of the groove sections 12 has an upper portion 12a and a circular-arc bulging portion 12b. As shown in FIG. 4, the upper portion 12a is formed into a substantially semicircular shape so as to follow the outer peripheral shape of the cylindrical insert nut 22. The bulging portion 12b is provided in the vicinity of the center of one side surface of the groove section 12 so that the insert nut 22 can be fixed on the upper portion 12a of the groove section 12. This protruding portion 12b is provided such that a distance between the protruding portion 12b and the side surface of the opposing groove section 12 becomes smaller than the outer diameter of the insert nut 22.

When the liquid-crystal module 1 of the first embodiment is assembled, the frame 10 is fitted into the recessed section 20a of the bezel 20 in the state shown in FIG. 1. At this time, as shown in FIG. 4, after having passed through an area of the frame 10 where the bulging portion 12b of the groove section 12 is situated and which has a width (a distance) smaller than the outer diameter of the insert nut 22, each of the insert nuts 22 of the bezel 20 is fastened by the semi-circular upper portion 12a and the circular-arc-shaped bulging portion 12b, both being provided in the groove section 12 of the frame 10. Subsequently, the two metal screws 23 are screw-fastened to the two screw holes 11, each having a female thread of the frame 10, by way of the two screw holes 21 of the bezel 20. Thereby, the frame 10 supporting the liquid-crystal panel 30 is fastened to the bezel 20, thereby assembling the liquid-crystal module 1 of the first embodiment.

As mentioned previously, in the first embodiment, the bulging portion 12b, which fastens the insert nut 22 on the upper portion 12a of the groove section 12, is provided on one side surface of the groove section 12 for housing the insert nut 22 projecting toward the interior surface of the bezel 20 such that a distance between opposing side surfaces becomes smaller than the outer diameter of the insert nut 22. The insert nuts 22 can be fastened with the groove sections 12 by means of the bulging portions 12b, and hence the bezel 20 having the insert nuts 22 attached thereon can be fixed to the frame 10 having the groove sections 12. Since the bezel 20 and the frame 10 are fastened together by means of the insert nuts 22 and the groove sections 12, the number of screws to be used for fastening the bezel 20 to the frame 10 can be reduced as compared with the number of screws employed heretofore. Therefore, the number of parts and the number of processing steps can be curtailed. Thereby, the number of the screw holes 11 formed in the frame 10 of resin can also be reduced. The possibility of occurrence of an assembly failure, which would otherwise be attributable to collapse of the screw threads of the screw holes 11 formed in the frame 10 of resin, can also be reduced, because the number of screw holes 11 formed in the frame 10 of resin is small.

In the first embodiment, the upper portions 12a that are formed into a substantially-semicircular form so as to follow the outer peripheral shape of the cylindrical insert nuts 22 are provided in the groove sections 12, whereby the outer peripheral portion of each of the insert nuts 22 can be readily fixed by means of the corresponding upper portion 12a and circular-arc bulging portions 12b.

In the first embodiment, the groove sections 12 are formed so as to penetrate from the exterior surface to the interior surface of the frame 10, and the three groove sections are formed with predetermined spaces therebetween. As a result, the groove sections 12 are easily deflected in the lateral direction. Hence, when the insert nuts 22 are fitted into the areas of the groove sections 12 where the bulging portions 12b are situated and which have a width (distance) smaller than the outer diameter of the insert nut 22, the groove sections 12 can be readily broadened laterally. As a result, the insert nuts 22 can be readily fitted into the groove sections 12.

First, in the first embodiment, as a result of the bulging portions 12b being formed into a circular-arc shape, when the insert nuts 22 pass through the areas where the bulging portions 12b of the groove sections 12 are situated and which have a width (distance) smaller than the outer diameter of the insert nut 22, the insert nuts 22 can be easily passed through the areas.

Second Embodiment

Figure 5:
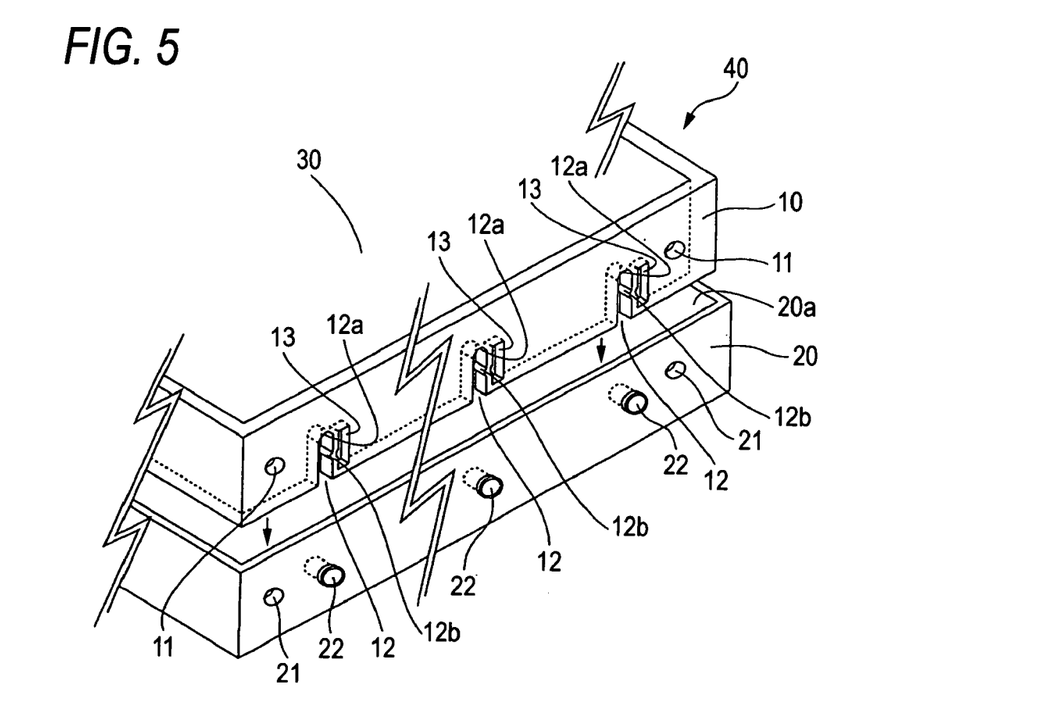
FIG. 5 is an enlarged perspective view partially showing an exploded state of a liquid-crystal module equipped with a liquid-crystal panel, a frame, and a bezel according to a second embodiment of the present invention.
Figure 6:
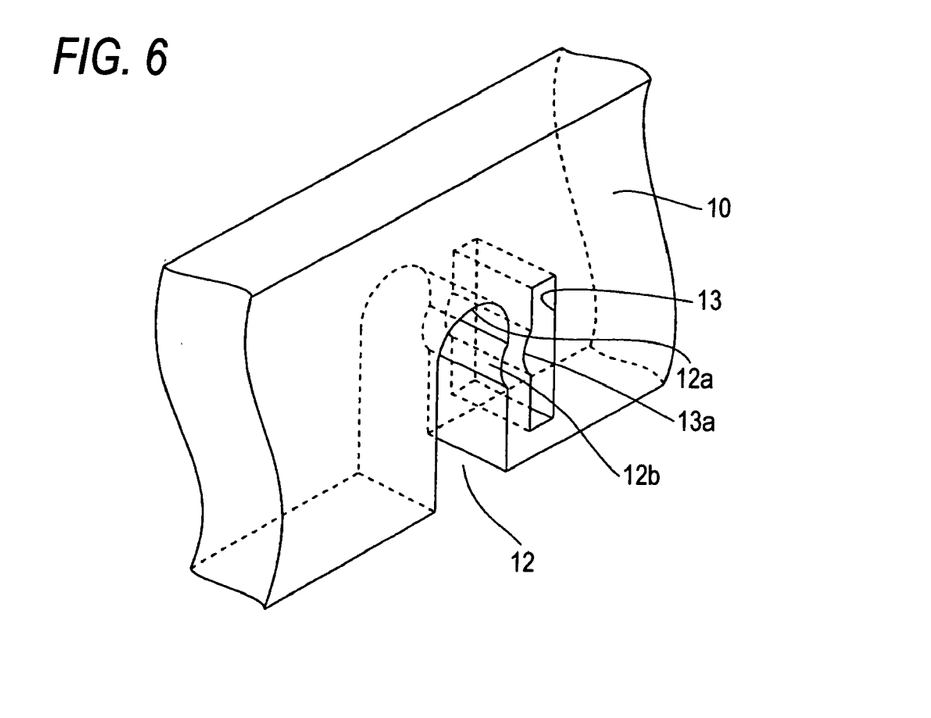
FIG. 6 is an enlarged view of a groove section and a cavity section according to the second embodiment shown in FIG. 5.
Figure 7:
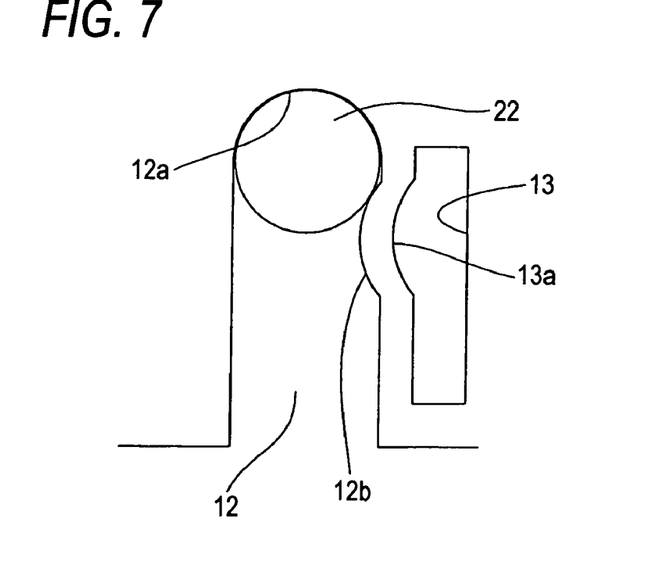
FIG. 7 is an enlarged view of the neighborhood of the groove section when the frame and the bezel, both being shown in FIG. 5, are assembled together.

FIG. 5 is an enlarged perspective view partially showing an exploded state of a liquid-crystal module equipped with a liquid-crystal panel, a frame, and a bezel according to a second embodiment of the present invention. FIG. 6 is an enlarged view of a groove section and a cavity section according to the second embodiment shown in FIG. 5. FIG. 7 is an enlarged view of the neighborhood of the groove section when the frame and the bezel, both being shown in FIG. 5, are assembled together. Next, a liquid-crystal module 40 of the second embodiment will be described by reference to FIGS. 5 through 7. The second embodiment is identical in structure with the first embodiment, except for cavity sections 13 of the second embodiment.

As shown in FIG. 5, in this second embodiment, the cavity sections 13 to be used for rendering the side surfaces having the bulging portions 12b of the groove sections 12 easy to deflect are formed in the frame 10. Each of the cavity sections 13 is formed at a position spaced a predetermined distance from one side having the bulging portion 12b of the groove section 12 formed thereon, so as to penetrate from the exterior surface to the interior surface of the frame 10. As shown in FIGS. 6 and 7, each of the cavity sections 13 has an indentation portion 13a in an interior surface thereof. The indentation portion 13a is formed so as to reflect the shape of the bulging portion 12b of the groove section 12.

When the liquid-crystal module 40 of the second embodiment is assembled, the frame 10 is fitted into the recessed portion 20a of the bezel 20. At this time, as shown in FIG. 7, after having passed through the areas of the frame 10 where the bulging portions 12b of the groove sections 12 are situated and which have a width (distance) smaller than the outer diameter of the insert nuts 22, the insert nuts 22 of the bezel 20 are fixed by the semicircular upper portions 12a and the circular-arc bulging portions 12b, both being provided in the respective groove sections 12 of the frame 10. Subsequently, the two metal screws are screwed to the two screw holes 11, each having a female thread, of the frame 10 by way of the two screw holes 21 of the bezel 20. As a result, the frame 10 supporting the liquid-crystal panel 30 and the bezel 20 are fastened together, thereby assembling the liquid-crystal module 40 of the second embodiment.

In the second embodiment, each of the cavity sections 13 to be used for rendering the side surfaces having the bulging portions 12b of the groove sections 12 easy to deflect is formed at the position spaced a predetermined distance from one side having the bulging portion 12b of the groove section 12 formed thereon, so as to penetrate from the exterior surface to the interior surface of the frame 10. When the insert nuts 22 pass through the areas of the frame 10 where the bulging portions 12b of the groove sections 12 are situated and which have a width (distance) smaller than the outer diameter of the insert nuts 22, the bulging portions 12b of the groove sections 12 can be deflected in a direction in which the groove sections 12 are broadened. Hence, the insert nuts 22 can be readily fitted into the groove sections 12. As a result, the insert nuts 22 can be readily fastened by the groove sections 12.

Other advantages of the second embodiment are the same as those of the previously-described first embodiment.

The embodiments described herein are considered to be illustrative in every respect and are not restrictive. The scope of the invention is not defined by the descriptions of the embodiments but by the scope of claims and includes meanings equivalent to the scope of the claims and all modifications falling within the same.

Figure 8:
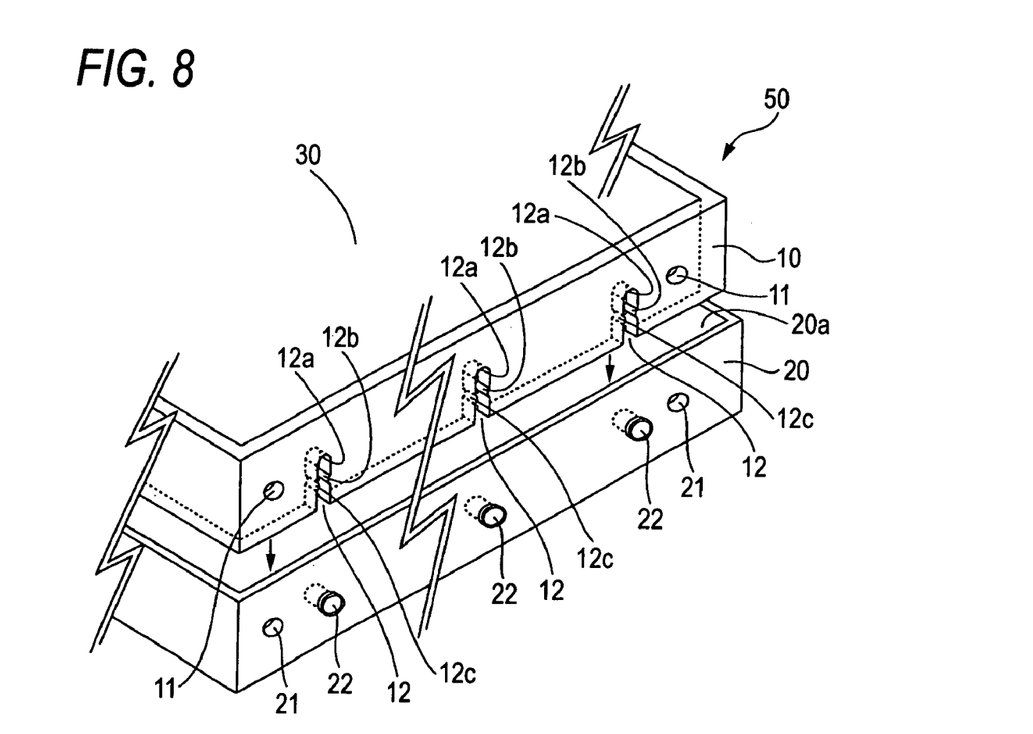
FIG. 8 is an enlarged perspective view partially showing that a liquid-crystal module equipped with a liquid-crystal panel, a frame, and a bezel according to a modification of the first embodiment is exploded.
Figure 9:
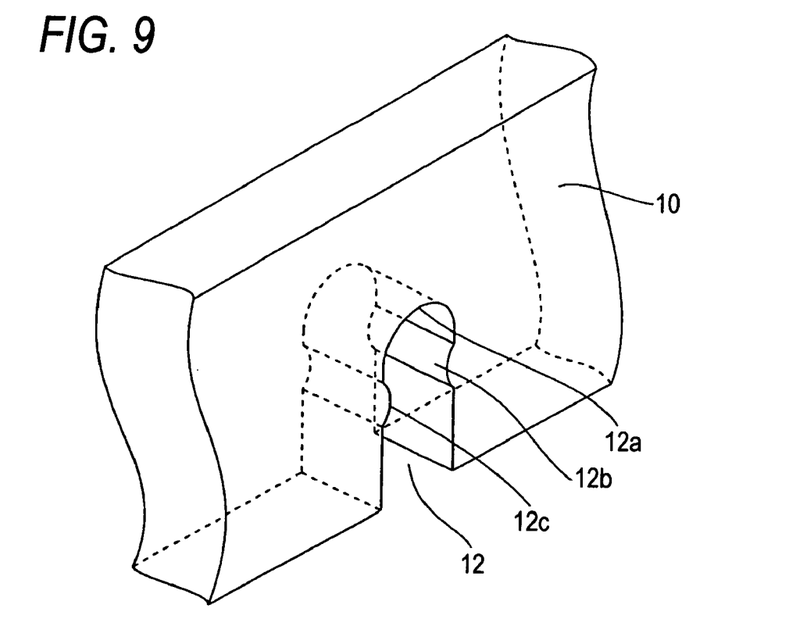
FIG. 9 is an enlarged view of the groove section according to the modification of the first embodiment shown in FIG. 8.

For instance, in the first embodiment, each of the bulging portions 12b to be used for fixing the insert nuts is provided on only one surface of each of the groove sections 12. However, the present invention is not limited to this embodiment. As in the case of a liquid-crystal module 50 according to a modification of the first embodiment shown in FIGS. 8 and 9, bulging portions 12b and 12c may be provided on both side surfaces of each groove section 12. By means of such a configuration, the insert nuts can be secured more reliably.

Figure 10:
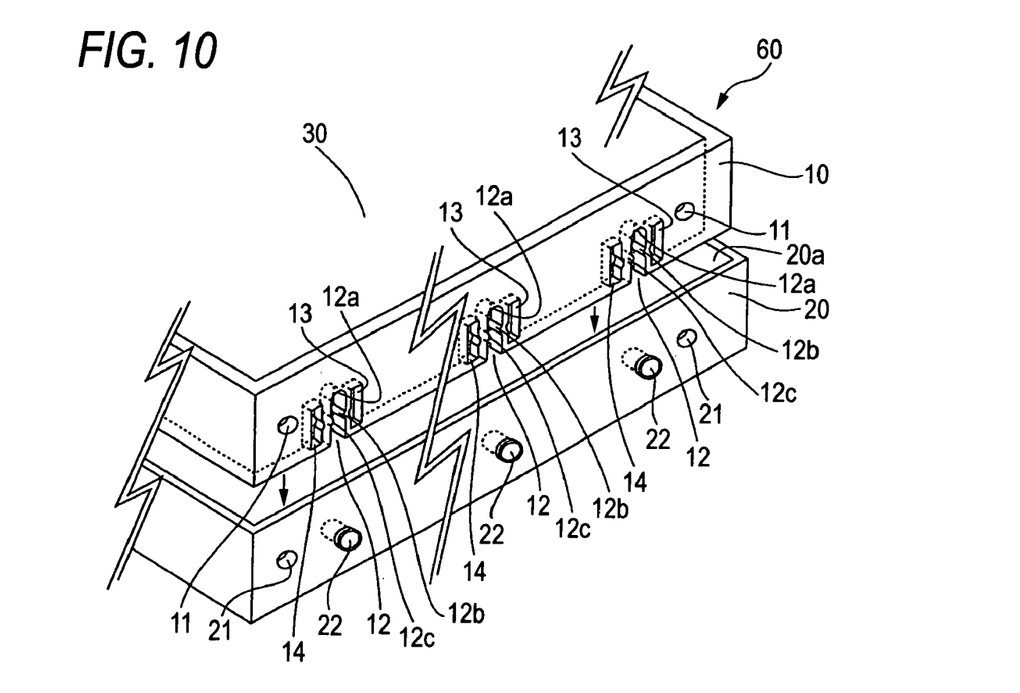
FIG. 10 is an enlarged perspective view partially showing that a liquid-crystal module equipped with a liquid-crystal panel, a frame, and a bezel according to a modification of the second embodiment is exploded.
Figure 11:
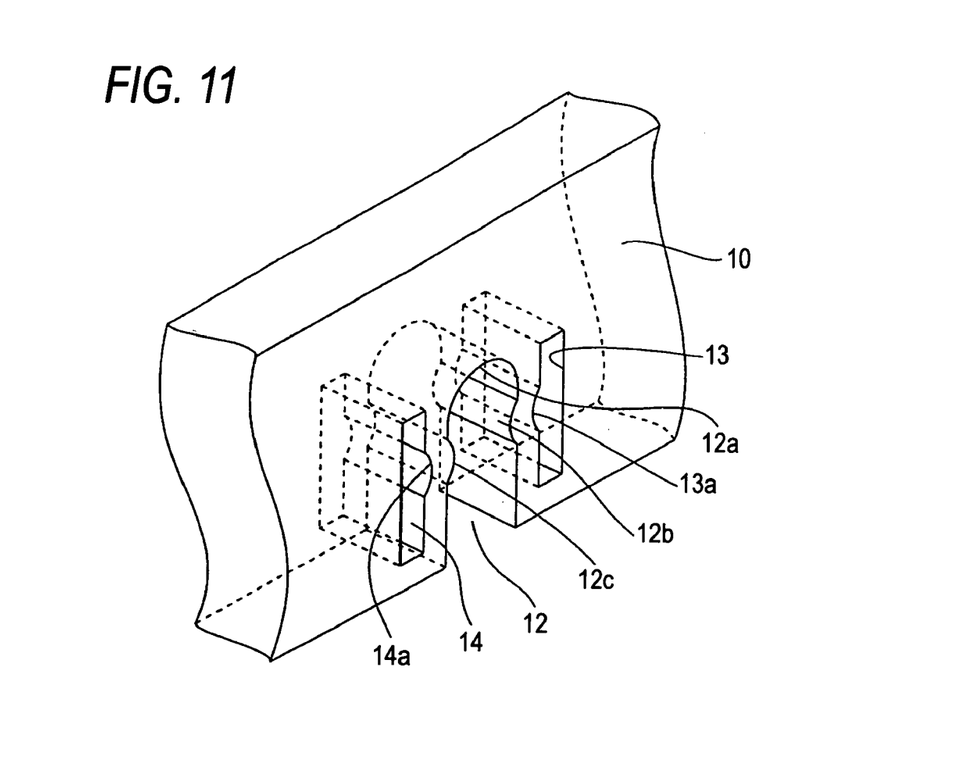
FIG. 11 is an enlarged view of a groove section and a cavity section according to the modification of the second embodiment shown in FIG. 10.

In the second embodiment, each of the cavity sections 13 to be used for rendering the side surface of the groove section 12 easy to deflect is formed at a position spaced a predetermined distance from one side surface of the groove section 12. The present invention is not limited to this embodiment. As in the case of a liquid-crystal module 60 according to a modification of the second embodiment shown in FIGS. 10 and 11, two cavity sections 13 and 14 may be provided at positions spaced a predetermined distance from the respective side surfaces of the groove section 12. If the cavity sections 13 and 14 are provided on both sides of the groove section 12, both side surfaces of the groove section 12 become easy to deflect. Accordingly, operation for fastening the insert nuts to the groove sections can be performed more easily. In the modification shown in FIGS. 10 and 11, each of bulging portions 12*c* is provided on a side surface of the groove section 12 adjoining the cavity section 14, and an indentation portion 14*a* corresponding to the bulging section 12*c* is provided in each of the cavity sections 14.

The previously-described embodiments have provided examples in which the insert nuts are provided in the bezel. However, the present invention is not limited to the embodiments. The same advantage can be yielded even when another nut with a female thread projecting toward an interior surface of the indentation portion of the bezel is provided on an interior circumferential surface of the nut. Specifically, projection sections, each having a female thread provided on an interior circumferential surface thereof, may be provided on an interior surface of the indentation portion of the metal bezel so as to project to a predetermined extent, by means of burring.

The embodiments have described examples in which the groove sections are formed so as to penetrate from the exterior surface to the interior surface of the frame. However, the present invention is not limited to these embodiments. The groove sections may be formed so as to have such a depth that no problem is encountered in fastening the insert nuts.

In the embodiments, the bulging portions of the groove sections are formed into a circular-arc shape. However, the present invention is not limited to the embodiments, and the bulging portions may be formed into another shape, such as a trapezoidal shape or a triangular shape.

In the previously-described embodiments, the upper portions of the groove sections are formed into a semicircular shape. However, the present invention is not limited to these embodiments. When the nut members, such as insert nuts, assume an outer shape other than a cylindrical shape (e.g., a rectangular shape or a triangular shape), the upper portion of the groove section is preferably formed into a shape conforming to the outer shape of the nut member.

In the second embodiment, the cavity sections are formed so as to penetrate from the exterior surface to the interior surface of the frame. However, the present invention is not limited to this embodiment. The only requirement is to form the cavity section so as to have a depth necessary to deflect at least the side surface of the groove section.

In the second embodiment, the cavity section is formed into a shape having an indentation portion. However, the present invention is not limited to this embodiment, and the cavity section may be formed into another shape, such as a rectangular shape or a cutout.

What is claimed is:

1. A liquid-crystal module comprising:
a liquid-crystal panel; a frame of resin supporting an outer peripheral portion of the liquid-crystal panel;
a metal bezel having a recessed section into which the frame of resin is to be inserted;
a cylindrical insert nut which is mounted on a side surface of the bezel so as to project toward an interior surface of the recessed section of the bezel and which has a thread groove in the interior surface thereof;
a first screw hole provided in the side surface of the bezel for inserting the screw when the frame is fitted into and fixed to the recessed section of the bezel;
a second screw hole having a female thread which is provided at a position on the side surface of the frame corresponding to the first screw hole and is for fastening the screw; and
a groove section which is provided so as to have a predetermined depth from a bottom section of an exterior surface of the frame and houses the insert nut projecting toward the interior surface of the bezel, wherein
the groove section is formed in a predetermined number at predetermined intervals so as to penetrate from the exterior surface to the interior surface of the frame; and
each of the plurality of groove sections includes
an upper portion formed into an essentially semicircular shape so as to follow an outer peripheral shape of the cylindrical insert nut and
a circular-arc bulging portion for fixing the insert nut to the upper portion of the groove section, the bulging portion being provided on at least one side surface of the groove section such that a distance between the bulging portion and an opposing side surface becomes smaller than an outer diameter of the insert nut.

2. A liquid-crystal module according to claim 1, further comprising:
a cavity section which renders easy to deflect the side surface having the bulging portion of the groove section formed thereon and which is provided at a position spaced, a predetermined distance, from at least one side surface having the bulging portion of the groove section formed thereon, so as to penetrate from the exterior surface to the interior surface of the frame.

3. A liquid-crystal display device, comprising:
a liquid-crystal panel;
a frame for supporting an outer peripheral portion of the liquid-crystal panel;
a bezel having a recessed section into which the frame is to be fitted;
a nut member which is provided in the bezel so as to project toward an interior surface of the recessed section of the bezel and has a screw thread on an interior circumferential surface thereof; and
a groove section provided in the frame for housing the nut member, wherein
the groove section has a bulging portion which is provided on at least one side surface of the groove section such that a distance between the bulging portion and an opposing side surface becomes smaller than an outer diameter of the nut member.

4. The liquid-crystal display device according to claim 3, wherein
the groove section is formed in a predetermined number at predetermined intervals so as to penetrate from an exterior surface to the interior surface of the frame.

5. The liquid-crystal display device according to claim 3, wherein
the nut member assumes a cylindrical shape; and the groove section includes an essentially semicircular upper portion formed so as to follow an outer peripheral shape of the cylindrical nut member.

6. The liquid-crystal display device according to claim 3, wherein the frame further includes a cavity section which is spaced a predetermined distance from at least one side surface of the groove section for rendering the side surface of the groove section easy to deflect.

7. The liquid-crystal display device according to claim 6, wherein the cavity section is formed so as to penetrate from the exterior surface to the interior surface of the frame.

* * * * *